(12) United States Patent
Schwertberger et al.

(10) Patent No.: US 8,532,878 B2
(45) Date of Patent: Sep. 10, 2013

(54) METHOD AND DEVICE FOR DETECTING AND COMPENSATING FOR A TRANSVERSE INCLINATION OF A ROADWAY ON WHICH A VEHICLE IS TRAVELING

(75) Inventors: Walter Schwertberger, Althegnenberg (DE); Markus Brummer, Schweitenkirchen (DE); Daniel Heyes, Munich (DE); Christoph Resch, Munich (DE); Walter Rosinger, Graz (AT)

(73) Assignee: MAN Truck & Bus AG, Munich (DE)

( * ) Notice: Subject to any disclaimer, the term of this patent is extended or adjusted under 35 U.S.C. 154(b) by 119 days.

(21) Appl. No.: 13/181,821

(22) Filed: Jul. 13, 2011

(65) Prior Publication Data

US 2012/0016556 A1    Jan. 19, 2012

(30) Foreign Application Priority Data

Jul. 13, 2010   (DE) .......................... 10 2010 026 916

(51) Int. Cl.
     *A01B 69/00*      (2006.01)
(52) U.S. Cl.
     USPC ........................................................... 701/41
(58) Field of Classification Search
     USPC ........................................................... 701/41
     See application file for complete search history.

(56) References Cited

U.S. PATENT DOCUMENTS

| | | | |
|---|---|---|---|
| 6,175,781 B1 | 1/2001 | Gesele et al. | |
| 6,185,485 B1 * | 2/2001 | Ashrafi et al. | ..................... 701/1 |
| 6,259,973 B1 | 7/2001 | Ehret et al. | |
| 6,332,353 B1 | 12/2001 | Gesele et al. | |
| 2002/0156580 A1 * | 10/2002 | Matsuura | ....................... 701/301 |
| 2008/0284574 A1 * | 11/2008 | Bosch | ........................... 340/438 |
| 2010/0017066 A1 * | 1/2010 | Lu et al. | ........................... 701/45 |
| 2010/0268420 A1 * | 10/2010 | Yasui et al. | ...................... 701/41 |

FOREIGN PATENT DOCUMENTS

| | | |
|---|---|---|
| DE | 196 07 050 A1 | 8/1997 |
| DE | 196 15 311 A1 | 10/1997 |
| DE | 198 21 617 C1 | 9/1999 |
| DE | 198 21 618 C1 | 9/1999 |

* cited by examiner

*Primary Examiner* — James Trammell
*Assistant Examiner* — Michael D Lang
(74) *Attorney, Agent, or Firm* — Laurence A. Greenberg; Werner H. Stemer; Ralph E. Locher

(57) ABSTRACT

A method and a device detect a transverse inclination of a roadway on which a vehicle is traveling. The transverse inclination is detected on the basis of a transverse acceleration of the vehicle that is generated by the transverse inclination of the roadway. A transverse acceleration of the vehicle is measured with a measuring device. A transverse acceleration that is generated by driving maneuvers of the vehicle is determined by a transverse inclination observer. The transverse acceleration of the vehicle due to the transverse inclination of the roadway is subsequently determined by determining a difference between the transverse acceleration generated by the driving maneuvers and the transverse acceleration measured by the measuring device. A method and a device are also provided for compensating for the transverse inclination of the roadway on which a vehicle is traveling. A steering angle which compensates for the transverse acceleration of the vehicle that is caused by the transverse inclination of the roadway, by way of a transverse inclination compensator. The steering angle is set by taking into consideration the transverse acceleration of the vehicle caused by the transverse inclination of the roadway.

4 Claims, 2 Drawing Sheets

METHOD AND DEVICE FOR DETECTING AND COMPENSATING FOR A TRANSVERSE INCLINATION OF A ROADWAY ON WHICH A VEHICLE IS TRAVELING

CROSS-REFERENCE TO RELATED APPLICATION

This application claims the priority, under 35 U.S.C. §119, of German patent application DE 10 2010 026 916.6, filed Jul. 13, 2010; the prior application is herewith incorporated by reference in its entirety.

BACKGROUND OF THE INVENTION

Field of the Invention

The present invention relates to a method for detecting and compensating for a transverse inclination of a roadway on which a vehicle is traveling. The transverse inclination of the roadway is detected and compensated on the basis of a transverse acceleration of the vehicle which is generated by the transverse inclination of the roadway. The invention further pertains to a device for detecting and compensating a transverse inclination of a roadway on which a vehicle is traveling, wherein the transverse inclination of the roadway is detected and compensated on the basis of a transverse acceleration of the vehicle which is generated by the transverse inclination of the roadway.

In the field of driver assistance systems for road vehicles, systems are known which keep vehicles within the lane by means of continuous steering interventions. Such systems generally serve to prevent accidents due to unintentional departure from the driver's own lane. Within the scope of the control of the vehicle behavior, the transverse acceleration is afforded a high degree of significance here as a measurement variable.

The transverse acceleration is normally measured by way of a transverse acceleration sensor. That measurement of the transverse acceleration takes place in an inertial system. As a result, in addition to the transverse forces which act on the vehicle owing to the movement of the vehicle, the value of the measured transverse acceleration also includes the forces which are caused by a transversely inclined roadway. In contrast, control methods for calculating required variables for coordinate systems which are usually fixed to the roadway form the basis. Such coordinate systems which are fixed to the roadway have the property that in them the roadway does not have any transverse inclination and the transverse acceleration used therein consequently also does not have any components which are caused by a transverse inclination of the roadway.

Owing to this situation—measured transverse acceleration in an inertial system and required transverse acceleration in a coordinate system fixed to the roadway, the transverse acceleration measured in the inertial system has to be transformed into the coordinate system which is fixed to the roadway.

U.S. Pat. No. 6,175,781 B1 and its German counterpart DE 198 21 618 describe a method and a device for controlling a movement variable which represents the movement of a vehicle. The method and device permit the transverse acceleration which is measured in the inertial system to be transformed into the coordinate system which is fixed to the roadway. However, such a method in which the transverse acceleration that is measured in the inertial system is transformed into the coordinate system which is fixed to the roadway is complicated and also requires a device which is suitable for performing the conversion.

SUMMARY OF THE INVENTION

It is accordingly an object of the invention to provide a method and a device for detecting and compensating for a transverse inclination of a roadway which overcome the above-mentioned disadvantages of the heretofore-known devices and methods of this general type and which provide for a method and a device that permit simplified control.

With the foregoing and other objects in view there is provided, in accordance with the invention, a method for detecting a transverse inclination of a roadway on which a vehicle is traveling, the method which comprises:

measuring a transverse acceleration of the vehicle with a measuring device;

determining a transverse acceleration of the vehicle generated by driving maneuvers, with a transverse inclination observer;

forming a difference between the transverse acceleration of the vehicle generated by driving maneuvers and the transverse acceleration of the vehicle measured by the measuring device, and concluding therefrom a transverse acceleration of the vehicle caused by the transverse inclination of the roadway.

In other words, a method for detecting a transverse inclination of the roadway on which a vehicle is traveling is provided, wherein the transverse inclination of the roadway is detected on the basis of a transverse acceleration of the vehicle which is generated or caused by the transverse inclination of the roadway.

According to the method, a transverse acceleration of the vehicle is preferably measured by a measuring device. Furthermore, a transverse acceleration of the vehicle which is generated by driving maneuvers can be determined by a transverse inclination observer. The transverse acceleration of the vehicle applied by the transverse inclination of the roadway can subsequently be determined by the transverse inclination observer by virtue of the fact that a difference between the transverse acceleration of the vehicle which is generated by driving maneuvers and the transverse acceleration of the vehicle measured by the measuring device is determined.

The proportion of the transverse acceleration of the vehicle measured by the measuring device which is made up by the transverse acceleration of the vehicle generated by the transverse inclination of the roadway is known by forming a difference between the transverse acceleration of the vehicle generated by driving maneuvers and the transverse acceleration of the vehicle measured by the measuring device, in order to determine the transverse acceleration of the vehicle which is generated by the transverse inclination of the roadway. As a result, there is no need to transform the value of the transverse acceleration of the vehicle generated by the transverse inclination of the roadway, a transformation of, for example, a transverse acceleration measured in an inertial system, into a coordinate system which is fixed to the roadway.

Furthermore, it is possible to integrate in a simple way the detection of the transverse inclination of the roadway on which a vehicle is traveling into an existing transverse control method which keeps the vehicle within a lane by continuous steering interventions. An existing transverse guidance controller can thereby be relieved of performing the detection of the inclination of the roadway. In a preferred embodiment of the invention, the transverse acceleration of the vehicle which is generated by driving maneuvers is determined from a correlation of the transverse acceleration of the vehicle which is generated by driving maneuvers with a yaw rate and a velocity of the vehicle.

With the above and other objects in view there is also provided, in accordance with the invention, a method for compensating for a transverse inclination of the roadway on which a vehicle is traveling. The method includes setting of a steering angle which compensates a transverse acceleration of the vehicle which is applied by the transverse inclination of the roadway. The setting of the steering angle is carried out here by way of a transverse inclination compensator which calculates the compensation angle on the basis of the interference acceleration, i.e. the transverse acceleration of the vehicle applied by the transverse inclination of the roadway, which is determined by the method for determining the transverse inclination of the roadway on which the vehicle is traveling. There is therefore the possibility of simple integration of the compensation of the transverse inclination of the roadway on which a vehicle is traveling into an existing transverse control method which keeps the vehicle within a lane by means of continuous steering interventions. An existing transverse guidance controller can thereby be relieved of performing the compensation of the inclination of the roadway, and rapid compensation of the inclination of the roadway can be achieved. The steering angle of the vehicle which compensates the transverse inclination of the roadway can be determined from a correlation of the compensating steering angle of the vehicle with a vehicle-dependent constant and the transverse acceleration of the vehicle applied by the transverse inclination of the roadway.

With the above and other objects in view there is also provided, in accordance with a preferred embodiment of the present invention, a device for detecting a transverse inclination of the roadway on which a vehicle is traveling. Again, the transverse inclination of the roadway is detected on the basis of a transverse acceleration of the vehicle which is generated by the transverse inclination of the roadway. The device for detecting a transverse inclination of the roadway preferably has a measuring device which is suitable for measuring a transverse acceleration of the vehicle, and a transverse inclination observer which is suitable for determining a transverse acceleration of the vehicle generated by driving maneuvers. The preferred transverse inclination observer is also suitable for determining a transverse acceleration of the vehicle caused by the transverse inclination of the roadway, by determining a difference between the transverse acceleration of the vehicle which is generated by driving maneuvers and the transverse acceleration of the vehicle measured by the measuring device.

The transverse inclination observer is preferably suitable for determining the transverse acceleration of the vehicle which is generated by driving maneuvers from a correlation of the transverse acceleration of the vehicle which is generated by driving maneuvers, with a yaw rate and a velocity of the vehicle.

According to the preferred embodiment of the present invention, a device for compensating a transverse inclination of the roadway on which a vehicle is traveling is also provided. The device for compensating a transverse inclination of the roadway on which a vehicle is traveling preferably has a transverse inclination compensator which is suitable for setting a steering angle which compensates a transverse acceleration of the vehicle applied by the transverse inclination of the roadway. The setting of the steering angle is carried out here on the basis of the transverse acceleration of the vehicle which is determined by the device for determining the transverse inclination of the roadway on which the vehicle is traveling, and applied by the transverse inclination of the roadway.

The transverse inclination compensator is preferably also suitable for determining the steering angle of the vehicle which compensates the transverse inclination of the roadway, from a correlation of the compensating steering angle of the vehicle with a vehicle-dependent constant and the transverse acceleration of the vehicle applied by the transverse inclination of the roadway.

Other features which are considered as characteristic for the invention are set forth in the appended claims.

Although the invention is illustrated and described herein as embodied in a method and device for detecting and compensating a transverse inclination of a roadway on which a vehicle is traveling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
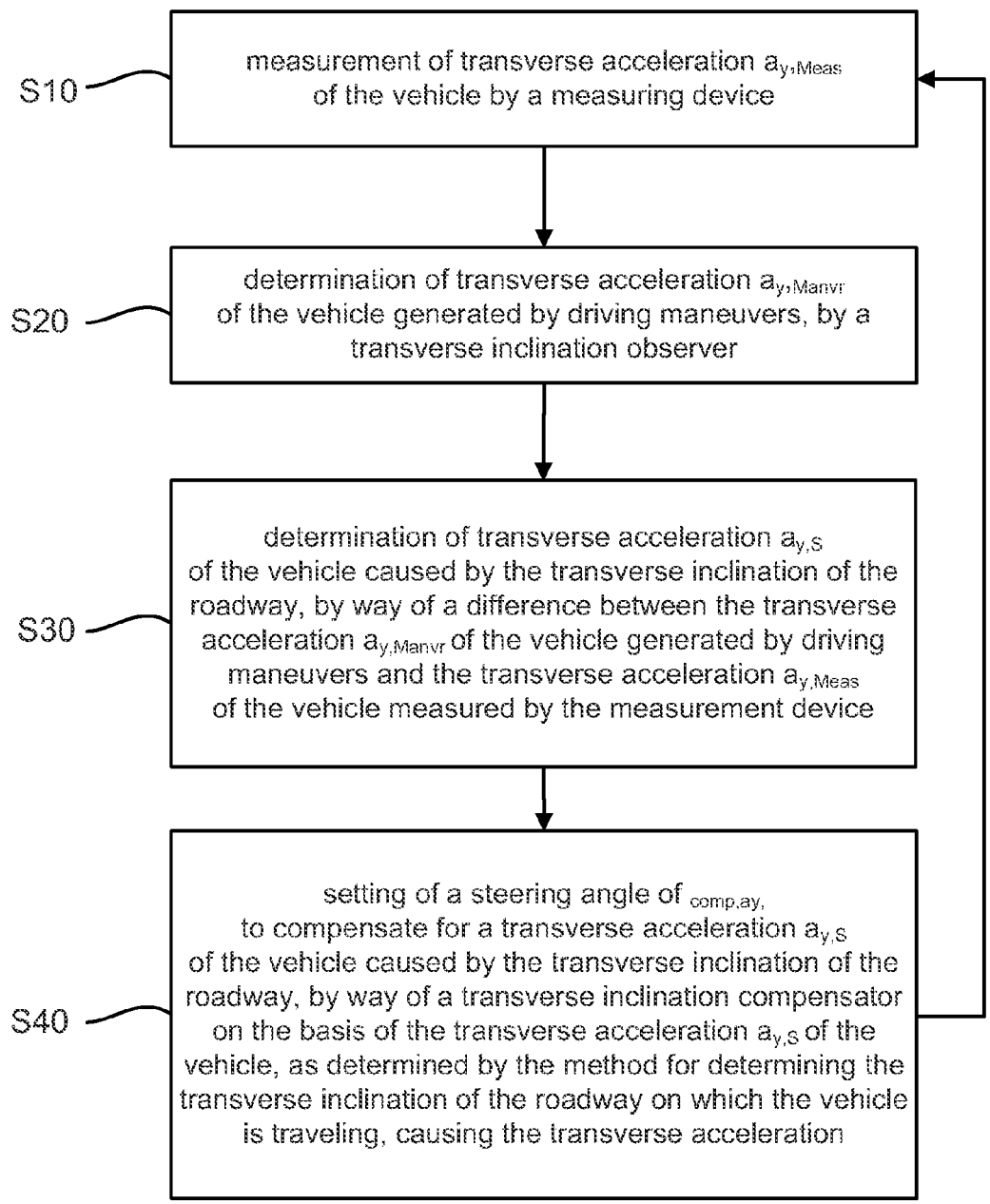
FIG. 1 is a simplified flowchart of a method for detecting and compensating a transverse inclination of a roadway on which a vehicle is traveling, corresponding to an exemplary embodiment of the present invention.

Referring now to the figures of the drawing in detail and first, particularly, to FIG. 1 thereof, there is shown a flowchart of a method according to the invention for detecting and compensating a transverse inclination of a roadway on which a vehicle is traveling.

In step S10, a transverse acceleration $a_{y,Meas}$ of the vehicle is measured by way of a measuring device.

In step S20, a transverse acceleration $a_{y,Manvr}$ of the vehicle which is generated by driving maneuvers is determined by way of a transverse inclination observer 10.

In step S30, a transverse acceleration $a_{y,S}$ of the vehicle applied by the transverse inclination of the roadway is determined by way of a difference between the transverse acceleration $a_{y,Manvr}$ of the vehicle generated by driving maneuvers and the transverse acceleration $a_{y,Meas}$ of the vehicle measured by the measuring device.

In step S40, a steering angle $\delta_{comp,ay}$, which compensates for a transverse acceleration $a_{y,S}$ of the vehicle applied by the transverse inclination of the roadway, is set by the transverse inclination compensator 11. The setting of the steering angle is carried out here on the basis of the transverse acceleration $a_{y,S}$ of the vehicle which is determined by way of the method for determining the transverse inclination of the roadway on which the vehicle is traveling and applied by the transverse inclination of the roadway. The method subsequently returns to step S10.

Figure 2:
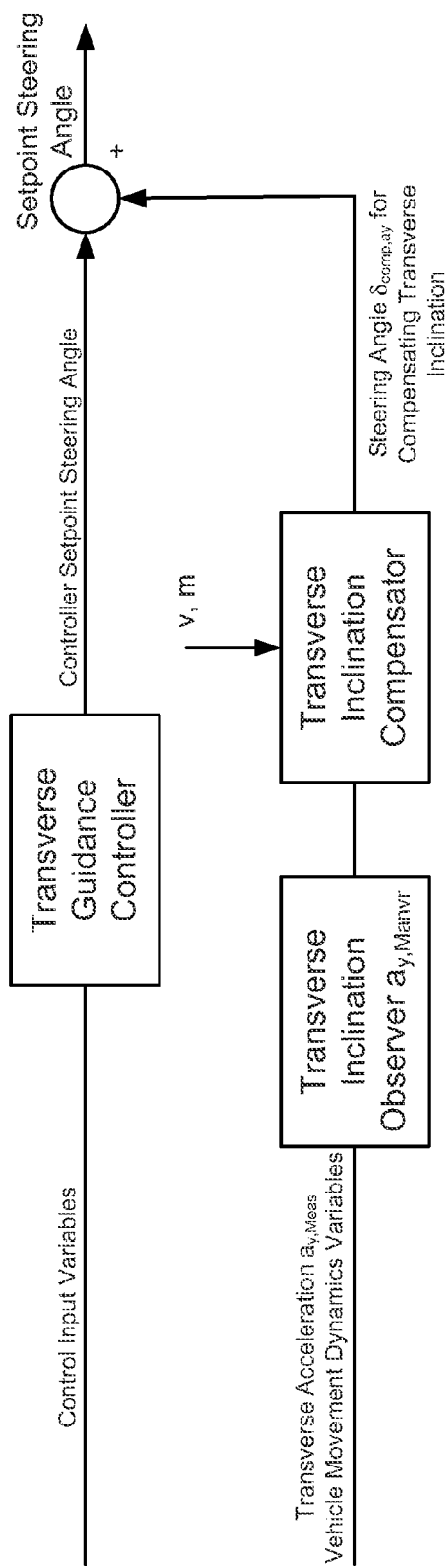
FIG. 2 shows a diagram of a device for detecting and compensating a transverse inclination of a roadway on which a vehicle is traveling, corresponding to an embodiment of the present invention and an existing transverse control system.

FIG. 2 is a schematic diagram of a device for detecting and compensating a transverse inclination of the roadway on which a vehicle is traveling, according to an embodiment of the present invention, and an existing transverse control system. The device for detecting and compensating a transverse inclination of the roadway on which a vehicle is traveling has the transverse inclination observer 10 and the transverse inclination compensator 11. The existing transverse control system has a transverse guidance controller 12.

The transverse inclination observer 10 receives, as input variables, the transverse acceleration $a_{y,Meas}$ of the vehicle measured by a measuring device, and a yaw rate $\Psi$ and a velocity v of the vehicle.

The transverse inclination observer 10 analyzes the transverse acceleration of the vehicle in order to infer the transverse inclination of the roadway. In this context, the transverse acceleration $a_{y,Manvr}$ of the vehicle, which is generated by driving maneuvers, is determined, wherein the transverse acceleration $a_{y,Manvr}$ of the vehicle, which is generated by driving maneuvers, is determined by means of a correlation of the yaw rate $\Psi$ and the velocity v of the vehicle.

$$a_{y,Manvr} = \Psi v \quad (1)$$

Alternatively, the transverse acceleration $a_{y,Manvr}$ of the vehicle, which is generated by driving maneuvers, can also be determined by way of other vehicle movement dynamics relationships of steering or yaw movements and the transverse acceleration $a_{y,Manvr}$ of the vehicle.

The interference acceleration which is generated by external forces, i.e. the transverse acceleration $a_{y,S}$ of the vehicle which is applied by the transverse inclination of the roadway, is subsequently determined by the transverse inclination observer 10 as a difference between the transverse acceleration $a_{y,Manvr}$ of the vehicle which is generated by driving maneuvers and the transverse acceleration $a_{y,Meas}$ of the vehicle which is measured by the measuring device, by means of $$a_{y,S} = a_{y,Manvr} - a_{y,Meas} \quad (2).$$

The transverse inclination observer 10 therefore has, as an output variable, the transverse acceleration $a_{y,S}$ of the vehicle which is applied by the transverse inclination of the roadway.

The transverse inclination compensator 11 has as input variable the transverse acceleration $a_{y,S}$ of the vehicle which is determined by the transverse inclination observer 10 and applied by the transverse inclination of the roadway. The transverse inclination compensator 11 has the function of compensating the transverse acceleration $a_{y,S}$ of the vehicle applied by the transverse inclination of the roadway, by setting a steering angle in the opposing direction of the transverse inclination of the roadway. For this purpose, a vehicle movement dynamics model is inverted and the necessary compensating steering angle $\delta_{comp,ay}$ is determined from the transverse acceleration $a_{y,S}$ of the vehicle applied by the transverse inclination of the roadway.

Within the scope of the embodiment of the present invention, a steady-state single-track model is inverted for this purpose. As a result, the necessary compensating steering angle $\delta_{comp,ay}$ can be determined proportionally with respect to a vehicle-dependent constant k by means of the relationship $$\delta_{comp,ay} = k a_{y,S} \quad (3).$$

The constant k is implemented in a speed-dependent and load-dependent fashion and is therefore a function of the velocity v and of the vehicle mass m. The transverse inclination compensator 11 therefore has the compensating steering angle $\delta_{comp,ay}$ as output variable.

The transverse guidance controller 12 of the existing transverse guidance system has at least one control variable x as input variable. If the vehicle deviates from a predefined lane, a controller setpoint steering angle $\delta_{RS}$, which forms the output variable of the transverse guidance controller 12, is formed by the transverse guidance controller 12. The output variable $\delta_{RS}$ of the transverse guidance controller 12 and the output variable $\delta_{comp,ay}$ of the transverse inclination compensator 11 are subsequently added and form a setpoint steering angle $\delta_{Setp}$ which compensates, by way of a steering intervention, the interference acceleration of the vehicle determined by the transverse inclination observer 10 and the control errors in the vehicle guidance determined by the transverse guidance controller 12.

While the concepts of the invention are explained above in specific detail and on the basis of specific exemplary configurations of the invention, it should be understood that the following claims are not so limited to the specific embodiment or embodiments.

The invention claimed is:

1. A method for determining a compensating steering angle for a vehicle, for compensating a transverse inclination of the roadway on which the vehicle is traveling, the method which comprises:
   determining a transverse inclination of a roadway on which the vehicle is traveling by:
   measuring a transverse acceleration of the vehicle with a measuring device;
   determining a transverse acceleration of the vehicle generated by driving maneuvers by correlating a yaw rate and a speed of the vehicle;
   forming a difference, using a processor, between the transverse acceleration of the vehicle generated by driving maneuvers and the transverse acceleration of the vehicle measured by the measuring device; and
   concluding therefrom a transverse acceleration of the vehicle caused by the transverse inclination of the roadway;
   inputting into a transverse inclination compensator a value corresponding to the transverse acceleration of the vehicle caused by the transverse inclination of the roadway and current vehicle parameters including a velocity and a mass of the vehicle;
   determining with the transverse inclination compensator a compensating steering angle δcomp,ay which compensates for the transverse acceleration of the vehicle caused by the transverse inclination of the roadway and which tends to oppose the transverse inclination, the compensating steering angle (δcomp,ay being proportional to a constant representing the current vehicle parameters and the transverse acceleration of the vehicle caused by the transverse inclination of the roadway.

2. The method according to claim 1, wherein the compensating steering angle $\delta_{comp,ay}$, is formed by inversion of a steady-state single track model.

3. In a motor vehicle, a device for determining a compensating steering angle $\delta_{comp,ay}$, which compensates for a transverse acceleration of a vehicle caused by the transverse inclination of a roadway upon which the vehicle is traveling, the device comprising:
   a measuring device configured for measuring a transverse acceleration of the vehicle; and
   a transverse inclination observer connected to said measuring device;

wherein said transverse inclination observer is configured for determining a transverse acceleration of the vehicle generated by driving maneuvers thereof from a correlation of the transverse acceleration of the vehicle generated by the driving maneuvers, with a yaw rate and a velocity of the vehicle; and wherein said transverse inclination observer is configured for determining a transverse acceleration of the vehicle caused by the transverse inclination of the roadway upon which the vehicle is traveling, by determining a difference between the transverse acceleration of the vehicle generated by driving maneuvers and the transverse acceleration of the vehicle measured by said measuring device;

a transverse inclination compensator connected to said transverse inclination observer and receiving therefrom a signal corresponding to the transverse acceleration of the vehicle caused by the transverse inclination of the roadway upon which the vehicle is traveling, said transverse inclination compensator also receiving current vehicle parameters including a velocity and a mass of the vehicle;

said transverse inclination compensator being configured for determining the compensating steering angle $\delta_{comp,ay}$ by multiplying a vehicle parameter constant being a function of the velocity and the mass of the vehicle with a value representing the transverse acceleration of the vehicle caused by the transverse inclination of the roadway upon which the vehicle is traveling as determined by, and received from, said transverse inclination observer.

4. In a vehicle, a steering angle controller, comprising:

the device according to claim 3 for determining the compensating steering angle $\delta_{comp,ay}$ compensating for a transverse acceleration of the vehicle caused by a transverse inclination of a roadway upon which the vehicle is traveling;

a transverse guidance controller configured for setting a controller setpoint steering angle of the vehicle; and a summing element connected to said transverse guidance controller and to said transverse inclination compensator, for combining the controller setpoint steering angle and the compensating steering angle $\delta_{comp,ay}$ to form a corrected setpoint steering angle controlling the steering of the vehicle.

* * * * *